United States Patent [19]

Fawcett et al.

[11] 4,303,945
[45] Dec. 1, 1981

[54] IMAGE MOTION COMPENSATION FOR A TV SENSOR SYSTEM

[75] Inventors: James M. Fawcett, Ellicott City; William F. Parrish, Baltimore, both of Md.

[73] Assignee: Westinghouse Electric Corp., Pittsburgh, Pa.

[21] Appl. No.: 779,664

[22] Filed: Mar. 21, 1977

[51] Int. Cl.³ .............................................. H04N 7/18
[52] U.S. Cl. ..................................... 358/222; 358/109
[58] Field of Search ............... 358/103, 109, 222, 223; 315/364; 356/28; 250/203 CT, 213 VT

[56] References Cited

U.S. PATENT DOCUMENTS

| | | | |
|---|---|---|---|
| 2,949,055 | 8/1960 | Blackstone | 358/109 |
| 3,284,662 | 11/1966 | Kagan | 358/73 |
| 3,393,320 | 7/1968 | Arazi | 250/549 |
| 3,499,109 | 3/1970 | Kihara et al. | 358/223 |
| 3,515,881 | 6/1970 | Philbrick et al. | 358/222 |
| 3,974,331 | 8/1976 | Pepin | 250/213 VT |

*Primary Examiner*—Joseph A. Orsino, Jr.
*Attorney, Agent, or Firm*—D. Schron

[57] ABSTRACT

An image motion compensation arrangement for a TV sensor system having an image intensifier section and a camera tube section, and which moves at a velocity V over a target area at an altitude H. An electron image of the viewed scene is accelerated between electrodes in the image intensifier section and a deflection coil is added to deflect this electron image. The coil is provided with a signal such that the deflection velocity is proportional to the ratio of V/H. With automatic light control provided, the deflection signal is also made a function of a control signal which controls a high voltage power supply to the accelerating electrodes.

3 Claims, 21 Drawing Figures

IMAGE MOTION COMPENSATION FOR A TV SENSOR SYSTEM

BACKGROUND OF THE INVENTION

1. Field of the Invention

The invention in general relates to TV sensor systems which move relative to a scene to be viewed, and particularly to a compensation arrangement therefore for systems wherein the ratio of velocity to distance to the scene is relatively high.

2. Description of the Prior Art

In survey and reconnaissance operations use is made of a TV sensor system for viewing a target area under investigation. The system is mounted on a carrier vehicle which moves over the area at a certain velocity V and at a certain altitude H.

For those applications where the V/H ratios are relatively high, there is an objectionable loss of resolution of the video picture displayed. The resolution loss due to motion has two primary causes. One is the actual smearing of the picture that occurs between TV frame readouts and the other is tube lag, an unavoidable property of the TV camera tube wherein residual signals remain on the tube's target element from frame to frame.

Moving mirrors, or a moving film is used in airborne photo-recconnaissance applications to maintain a point in the center of the scene motionless at the image plane. The arrangement prevents smearing during camera exposure time, however, the use of a mirror or TV camera motion for image motion compensation is difficult for TV use because of the fast deflection required at conventional TV rates.

In image intensifier hand-held directly viewed night vision devices, a magnetic field has been used for motion compensation. The arrangement, however, uses a plurality of gyroscopic pickoffs for supplying feedback signals, to compensate for the user's hand movement.

The present invention accomplishes image motion compensation electronically in a television sensor system wherein the V/H ratio is relatively high.

SUMMARY OF THE INVENTION

A TV sensor system including an imaging device section and an image intensifier section coupled thereto is adapted for travel over an area to be surveyed. The imaging device section receives an energy image of the scene being viewed and provides a video signal indicative thereof. The image intensifier section has a photocathode which transforms an incident photon image of the viewed scene into an electron image which is accelerated between first and second high voltage electrodes. The electron image is coupled to the imaging device section either directly or by way of another image intensifier section.

First and second signals are derived and are respectively proportional to the carrier velocity and altitude relative to the area being viewed. In addition, a ramp generator provides a third signal whose amplitude periodically varies with time. A deflection coil is positioned relative to the image intensifier section to deflect the electron image therein and the first, second and third signals are combined to derive a coil drive signal which when applied to the deflection coil will maintain the electron image centered so as to reduce smearing.

DESCRIPTION OF THE PREFERRED EMBODIMENT

Figure 1:
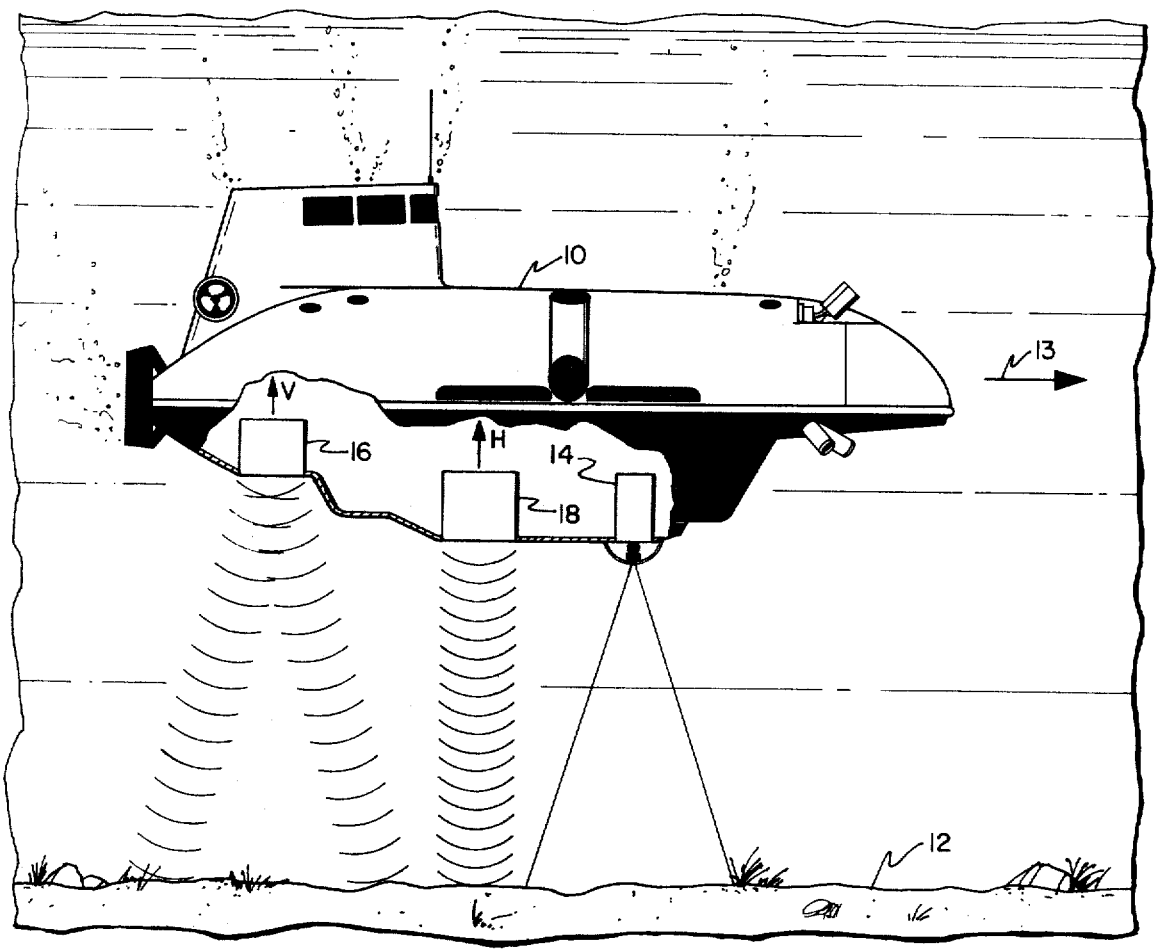
FIG. 1 illustrates a typical operational application for a TV sensor system.

Although the present invention can be used in a variety of applications wherein a TV sensor and target area move relative to one another, it will be described by way of example with respect to an underwater use as illustrated in FIG. 1.

An underwater carrier vehicle 10 is adapted for movement over a target area 12, to be viewed. The carrier vehicle 10 travels at a certain velocity V in the direction of arrow 13 and carries a TV sensor system 14 disposed for viewing the target area and at an altitude H above it.

Sonar 16 such as a velocity doppler sonar system emits acoustic energy and in a well-known manner derives a first signal indicative of the relative velocity between the carrier vehicle, and accordingly the TV sensor system, and the area to be viewed. A second sonar device 18 such as an altitude sensor emits acoustic pulses and in a well-known manner derives a second signal indicative of the distance of the TV sensor system to the target area 12.

Figure 2:
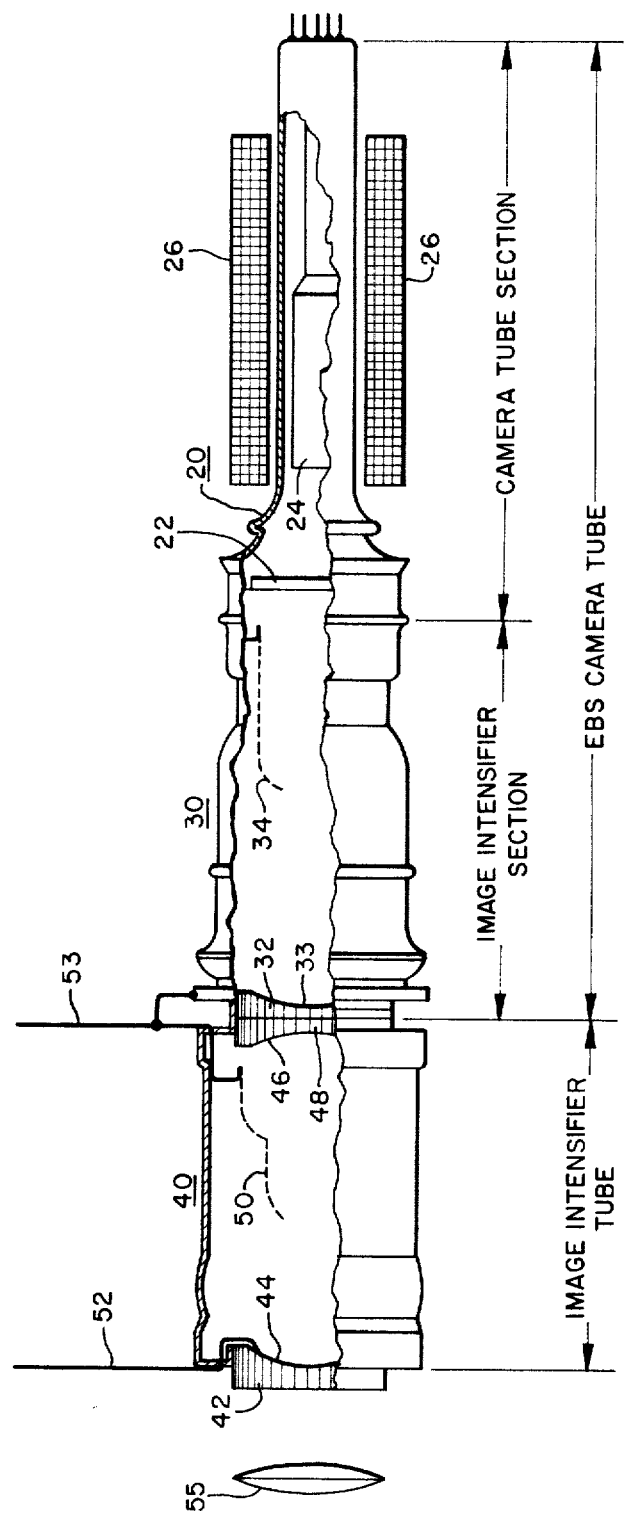
FIG. 2 is a view, with portions broken away, of a typical TV sensor system.

FIG. 2 illustrates by way of example the TV sensor system which may be utilized herein. The system includes an imaging device section and an image intensifier section coupled thereto. Although the imaging device section may be a solid state pickup, FIG. 2 illustrates a commercially available system wherein the imaging device section is a TV camera tube 20 which includes a target 22 and an electron beam reading gun 24.

Coupled to the camera tube section 20 is an image intensifier section 30 which includes a fiber optic faceplate 32 with a photocathode 33 deposited on the inner surface of the plano-concave fiber optic faceplate. An optical image, focused onto the plane surface of the fiber optic faceplate, is conveyed to the photocathode 33 where photoelectrons are emitted in direct proportion to the amount of incident radiation. The resulting electron image is accelerated toward the target 22 and is brought to focus thereon by means of an electrostatic lens (not detailed) formed between the photocathode surface and an anode 34. Details have been omitted since the arrangement is a commercially available item, one example being an EBS (electron-bombarded silicon) camera tube type WX-32592, of Westinghouse Electric Corporation.

Even greater sensitivity may be obtained by fiber optically coupling a single stage image intensifier to the EBS camera tube. Accordingly, in FIG. 2 an image intensifier tube 40 is provided and is similar to the image intensifier section of the EBS camera tube in the inclusion of a similar fiber optic faceplate 42 having a photocathode surface 44 which transforms the photon image incident on the faceplate into an electron image. The electron image is accelerated and focused on output phosphor 46. As electrons strike the phosphor, kinetic energy acquired from the accelerating voltage is transformed into radiant energy which leaves through the output fiber optic 48, coupled to fiber optic faceplate 32.

The acceleration and focusing of the electron image is accomplished by a high voltage potential applied between photocathode 44 and an anode 50. Operating potential is supplied by means of electrode leads 52 and 53 from a high voltage power supply. In a typical operation, the potential difference may be in the order of −15 kV with −25 kV being applied by means of lead 52 to photocathode 44, and −10 kV being applied by means of lead 53 to anode 50. With anode 34 of the EBS camera tube being at ground potential, lead 53 may also supply the −10 kV to photocathode 33. One example of image intensifier tube 40, forming another image intensifier section is image intensifier model WL-30677 of Westinghouse Electric Corporation. Details of the tube, as well as other connections thereto, have not been illustrated.

In operation the electron image of the scene being viewed through lens 55 is accelerated from photocathode 44 and is coupled, by means of image intensifier section 30 to camera tube target 22. If image intensifier section 40 is not utilized, an electron image of the scene will be coupled from photocathode 33 directly to target 22.

If the apparatus is moving over the target area at a relatively low altitude or at a relatively high speed, the scene image at the camera target 22 must remain still while the image at the photocathode 44 is still moving. Time must be allowed to track the scene for a certain period of time to allow the scene charge to be scanned off. The image must then be advanced in the direction of expected motion by an amount proportional to the V/H ratio to start a new frame of information. The smearing problem is illustrated by the simplified line diagrams of FIGS. 3A and 3B wherein line 60 represents a fiber optic faceplate with a photocathode, disposed behind the lens 61, and line 62 represents a target element of a TV camera tube. Point P on the target area 64 to be viewed is focused to point P' on the photocathode and then, by electrostatic lens action, is focused to point P" on the target element 62. Point P on the target area is at a distance X from the intersection of the target area with optic axis 66 and point P" is at a distance X" from the intersection of the optic axis with the target element 62.

Figure 3A:
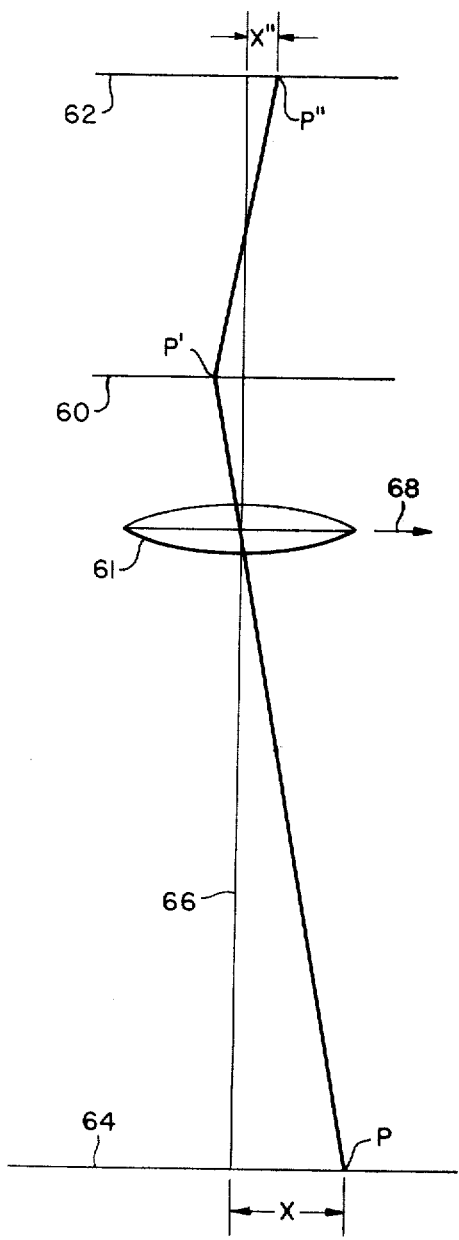
FIGS. 3A and 3B are diagrams illustrating motion of the TV sensor system relative to the area being viewed and the consequent problem developed.
Figure 3B:
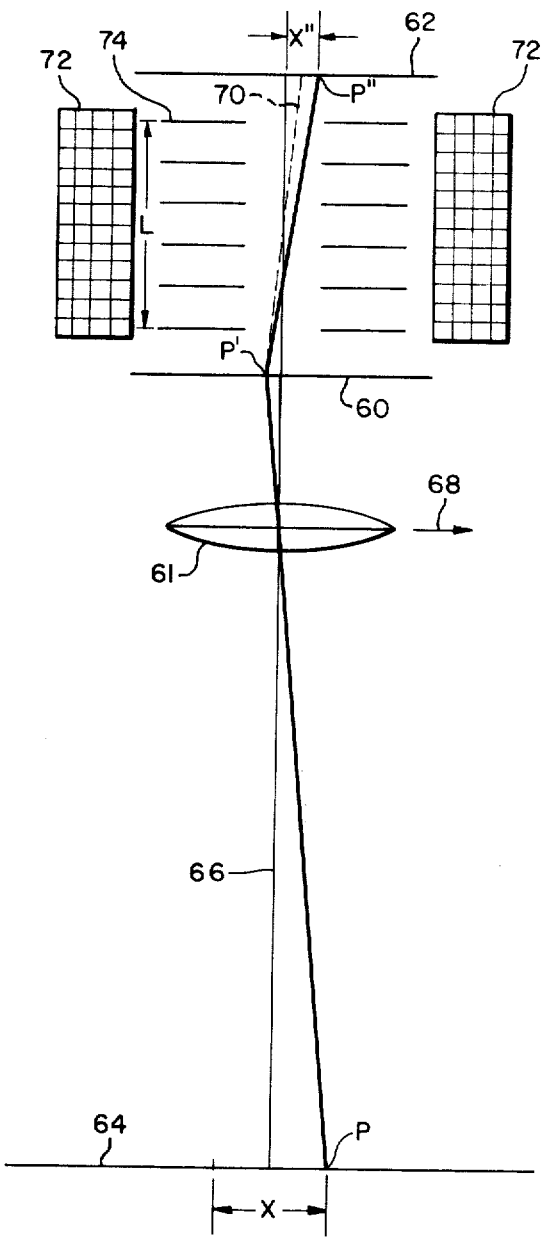

With the apparatus moving in the direction of arrow 68 at a certain velocity, at a subsequent incremental period of time point P will be, as illustrated in FIG. 3B, closer to the optic axis 66 and, as illustrated by dotted line 70, will impinge upon a point closer to the intersection of the optic axis with target element 62 than was the case in FIG. 3A. Point P" in effect has moved during the time that the target element is being read resulting in a degraded resolution. In the present invention deflection coil means 72 are provided to produce a magnetic field 74 of length L to deflect the electron image from point P' so as to impinge at point P" at a distance X" from the intersection of the optic axis as was the case in FIG. 3A.

The deflection coil signal is such as to maintain the image frozen on the target element for a predetermined number of frame times which may be a function of tube lag, while the amount of deflection is governed by the V/H ratio.

Tube lag refers to the residual stored charge on the target element from preceding frame readouts. The lag depends upon the particular tube and by way of example let it be assumed that in the present example after an image has been presented to the target element the stored charge remaining at the second field (two fields per frame) is approximately 45%, at the third field approximately 17%, at the fourth field approximately 10%, at the fifth field approximately 6% and an imperceptible amount by the sixth field (third frame).

Figure 4:
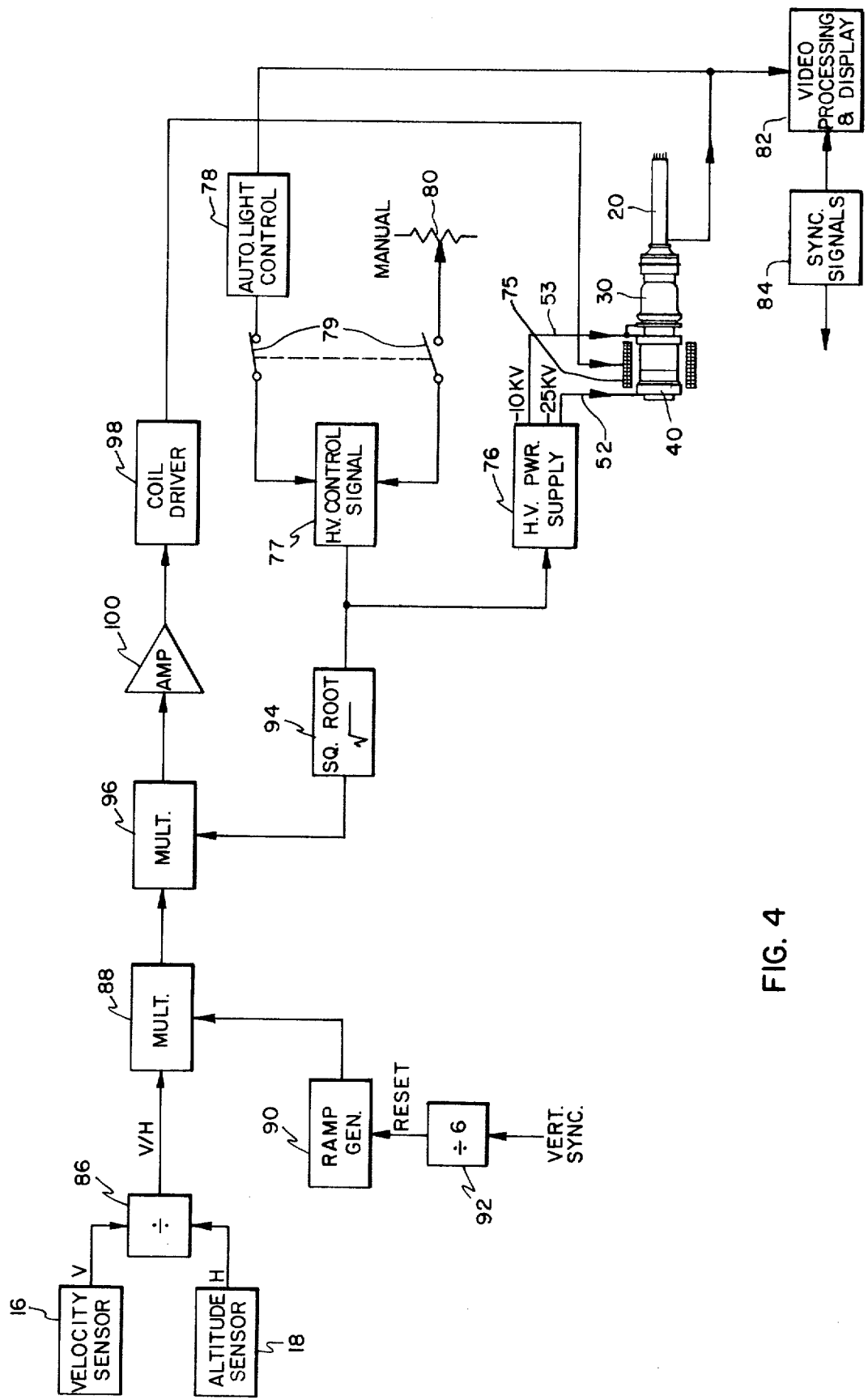
FIG. 4 is a block diagram of one embodiment of the present invention.

One embodiment of apparatus for accomplishing image motion compensation is illustrated in FIG. 4 to which reference is now made. In FIG. 4 the TV sensor system is the same as that described with respect to FIG. 2 and accordingly the components thereof have the same reference numerals. With the present invention, however, an additional element is included in the form of deflection coil 75 positioned to deflect the accelerated electron image in the image intensifier section 40.

Operating potential for accelerating the electron image in image intensifier section 40 is provided by high voltage power supply 76. For those systems which include automatic light control the accelerating potential difference may be varied by means of control circuit 77 which provides a control signal to high voltage power supply 76 for controlling and varying the output thereof. The magnitude of this control signal is governed by an automatic light control circuit 78 which senses the average video signal, and by the feedback arrangement, maintains it at a desired predetermined level. Alternatively, and by means of switch 79, the intensity of the final display may be adjusted manually with the provision of potentiometer 80.

A video output signal from TV camera tube 20 is provided to video processing and display apparatus 82 and synchronizing waveforms necessary for TV operation are provided by sync circuit 84. The invention will be described by way of example in conjunction with a TV system having a 1/30 second (33.33 milliseconds) frame rate with a two field per frame interlace, each field being 1/60 second (16.66 milliseconds).

The deflection of the electron image in image intensifier section 40 is a function of the V/H ratio and FIG. 4 illustrates the velocity sensor 16 and altitude sensor 18 previously shown in FIG. 1. The ratio of the respective output signals therefrom are obtained by divider circuit 86 and the signal, V/H, is provided to multiplier circuit 88.

Multiplier circuit 88 additionally receives the ramp generator 90 output signal having an amplitude which periodically varies with time as a sawtooth waveform and is modified in multiplier 88 by the V/H signal. In order to compensate for tube lag and to derive a high resolution signal, the period of the ramp generator is chosen to be equal to three TV frame times, that is, 100 milliseconds. This periodicity is accomplished with the provision of divide by 6 circuit 92 which receives the vertical sync signals from sync circuit 84 and will provide an output reset signal to ramp generator 90 upon the occurrence of each sixth vertical sync signal (due to the interlace there are two vertical sync signals per frame).

The electron velocity of the electron image accelerated between the spaced-apart electrodes at image intensifier section 40 is directly proportional to the square root of the voltage difference through which it passes. In the present invention the ramp generator output waveform is further modified by a signal indicative of the electron image velocity. Since the control signal provided by control circuit 77 is an indication of the power supply potential difference supplied to the accelerating electrodes, this control signal is operated upon by square root circuit 94 to derive a fourth signal which further modifies the sawtooth waveform provided by ramp generator 90. This modification may be accomplished by the provision of multiplier circuit 96 which receives the signal from multiplier 88 and provides the further modified signal to a coil driver 98 after amplification in amplifier 100.

The output signal of coil driver 98 therefore is provided to coil 75 to deflect the electron image not only as a function of the ratio V/H but, in systems where automatic light control is provided, by the square root of the electron image accelerating potential. In other words, ramp generator 90 provides the basic sawtooth waveform for deflecting the electron image. The period of the sawtooth waveform is governed by expected tube lag characteristics and the waveform is modified as a function of the velocity of the carrier and its altitude above a target area, as well as by the electron image accelerating potential to maintain an electron image centered on a camera tube target element for the period of the sawtooth waveform, that is, three frame times.

Since the scene image is kept centered on the camera tube target element for three frame times, not only is the effect of smearing due to motion eliminated, but the process reduces the effects of tube lag. In addition, however, an improved video signal is provided since it takes a finite time for the signal to build up, from the scanning process. In three frame times 100% of a newly presented image may be read out by the camera's electron gun. It is seen therefore that in the present example every third frame is a "good" frame.

Figure 5:
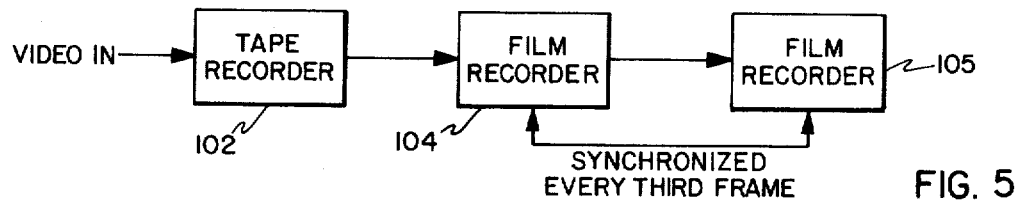
FIG. 5 is a block diagram of one type of video processing and display arrangement which may be utilized herein.
Figure 6:
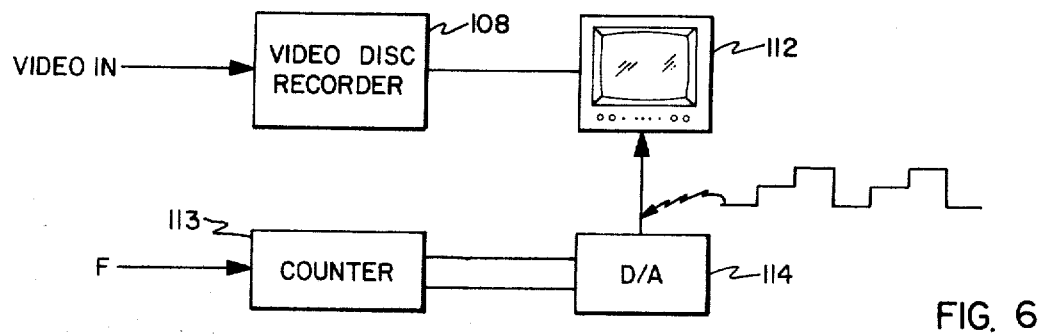
FIG. 6 illustrates another processing and display arrangement.
Figure 8:
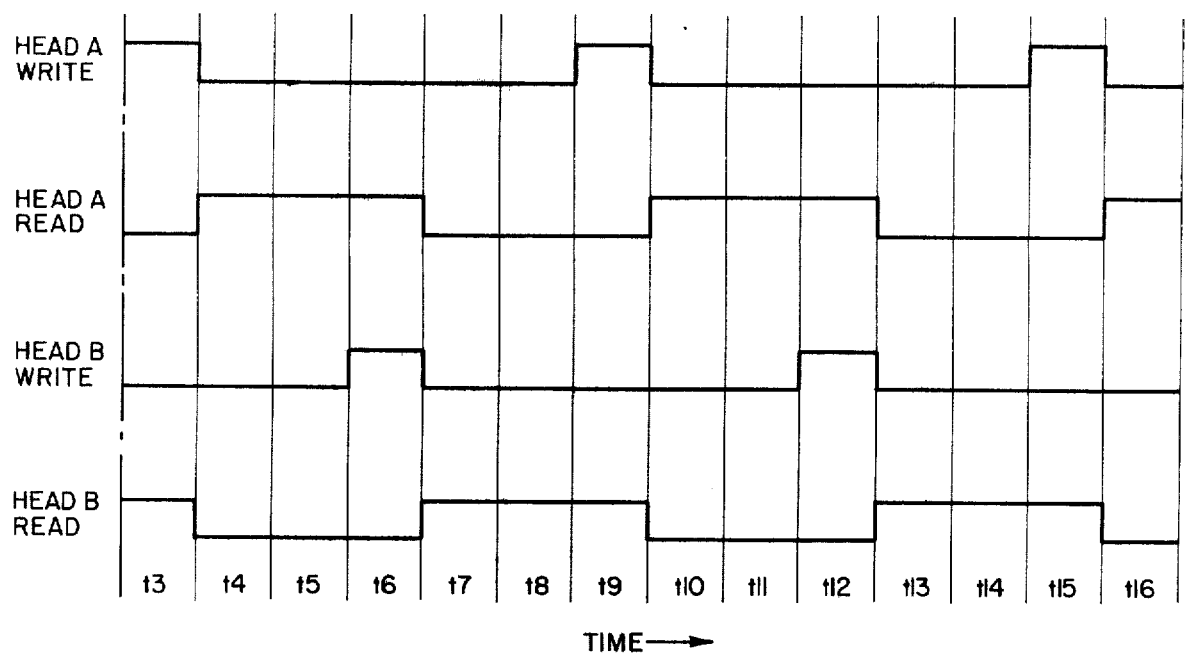
FIG. 8 illustrates several waveforms for the operation of the arrangement of FIG. 6.
Figure 7:
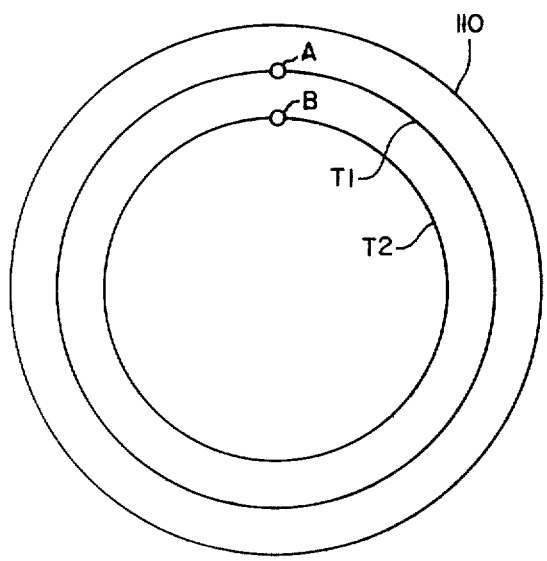
FIG. 7 illustrates a video disc for use in the arrangement of FIG. 6.

The processing of the video signal may be accomplished by any one of a number of commercially available systems. For example, FIG. 5 illustrates a processing system for those applications where real time viewing is not essential. The video output signal is recorded on tape by means of video tape recorder 102 and is thereafter transferred to a movie film recorder 104, each movie frame thereof recording a corresponding TV frame. With a tube lag of three frames, or in general n frames, where $n > 1$, every third or $n^{th}$ frame is the desired frame to be used, and a second movie film recorder 105 is provided and synchronized with movie film recorder 104 to record, on successive movie frames, every third or $n^{th}$ movie frame of recorder 104.

Where real time viewing is desired, the arrangement of FIG. 6 may be utilized. A video disc recorder 108 receives the input video for recording the signals on a video disc such as disc 110 in FIG. 7. Two tracks T1 and T2 of the disc are illustrated in conjunction with read/write heads A and B positioned over the respective tracks. The heads are operated in the sequence illustrated by the waveforms of FIG. 8. The horizontal time axis is divided into a plurality of TV frame times designated t3, t4, t5. . . etc. During frame time t3, the write amplifier to head A is enabled so that one frame of video is written onto track T1 (disc rotation is 1,800 rpm). During frame times t4, t5 and t6 this same frame that was written in time t3 is read out three times. At frame time t6 the write amplifier for head B is enabled, thus writing the information from frame t6 onto track T2 which starting at frame time t7 is displayed for three frame times. At frame time t9 the head amplifier to head A is again enabled to repeat the sequence. Thus, by enabling the read and write amplifiers for the video disc in the sequence illustrated in FIG. 8, only a good frame is written on the disc and thereafter displayed for three frame times. As an alternative, a suitable solid state memory with frame storage capacity and suitable switching circuitry may be utilized in place of the video disc arrangement.

Figure 9A:
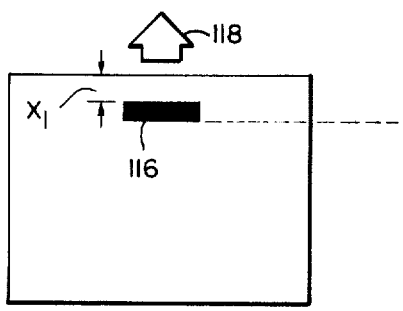
FIGS. 9A-9E illustrate the display of a target on a TV monitor during successive TV frame times.
Figure 9B:
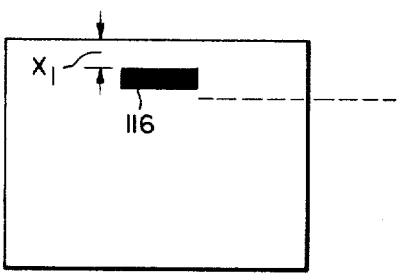
Figure 9C:
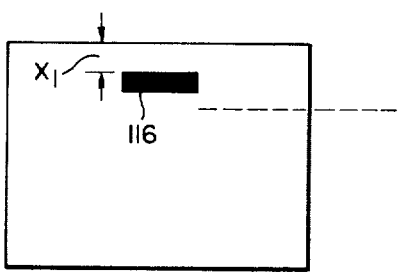
Figure 10C:
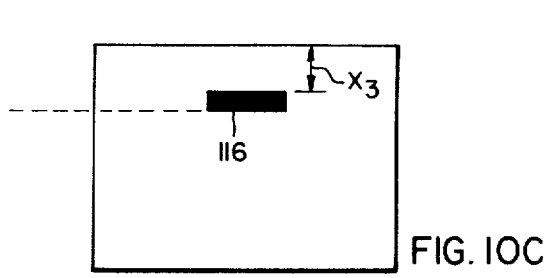
Figure 9D:
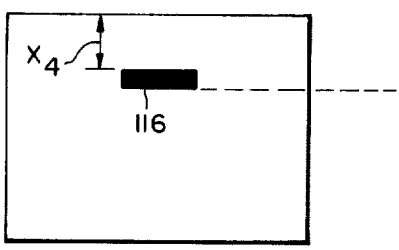
Figure 10D:
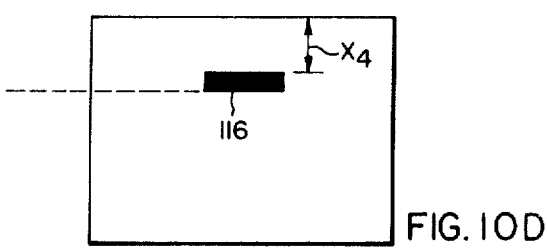
Figure 9E:
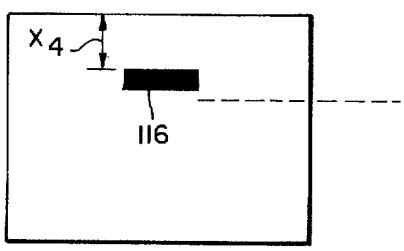
Figure 10E:
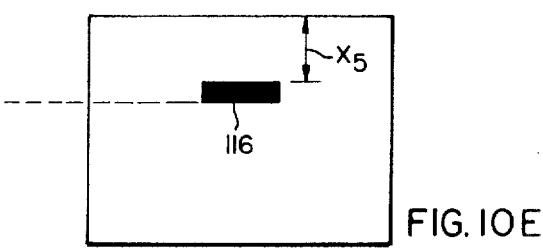

The display in the form of TV monitor 112 in FIG. 6 is also provided with a deflection signal which is superimposed upon the normally occurring vertical deflection of the monitor. The supplemental deflection arrangement includes a counter 113 which is in the form of a two-bit counter which is preset to a binary output of 01. Counter 113 receives frame identification signals F (provided for example by the source of signals 84 in FIG. 4) and in response thereto will provide a binary output 01, 10, and 11 after which the sequence is repeated. The output of counter 113 is provided to a digital to analog converter 114 which then provides an output stairstep waveform as illustrated, with each level of the waveform occurring in response to a new frame indication. The reason for this superimposed deflection will be explained with additional reference to FIGS. 9A–9E and 10A–10E, all of which show the screen of the monitor 112 with a target in the form of a bar 116 displayed thereon. The display of the target bar is as though the viewer were looking down on the target area through a window with movement being in the direction of arrow 118 relative to the target area. In FIG. 9A the target bar 116 is at a distance $X_1$ from the top of the display. Without the supplemental deflection control, this target bar for the next two frames, as illustrated in FIGS. 9B and 9C will also be at this same distance $X_1$ from the top of the display. During the frame time of FIG. 9C, the next good frame is recorded on the video disc and is displayed three more times starting with the frame time of FIG. 9D at which point the target bar 116 will have moved down the display to a distance $X_4$ and will remain in that position for two additional frame times. From a subjective viewpoint, the target bar 116 remains in place, then jumps, then remains in place, then jumps and does not produce an apparent smooth motion.

Figure 10A:
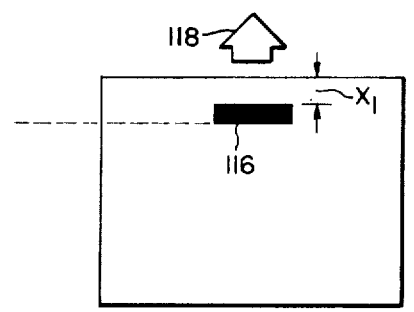
FIGS. 10A-10E illustrate an improved display.
Figure 10B:
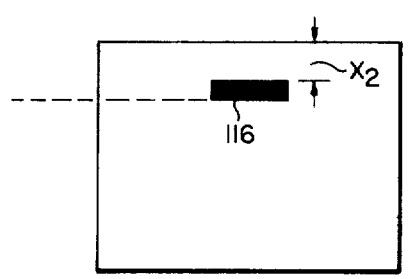

With the stairstep waveform having a period of three frame times, the target bar 116, as illustrated in FIG. 10A, is at a distance $X_1$ from the top of the display as was the case in FIG. 9A. In FIG. 10B, however, due to the superimposed deflection, the target bar has moved down somewhat to a position $X_2$ away from the top of the display and for the third frame time as in FIG. 10C, the target bar has moved to a distance $X_3$ from the top of the display. For comparison purposes, a dotted line has been projected from the moving target bar in FIG. 10 over to the target bar of FIG. 9. After the frame time of FIG. 10C, a new good frame is to be displayed at a position X₄ from the top of the display, corresponding to that position of FIG. 9D. The stairstep deflection will have returned to its starting position to again move the target bar slowly down the screen for two more frame times. The display therefore with the inclusion of the additional deflection control presents the target as moving slowly down the screen as opposed to the stop and jump movement of FIGS. 9A-9E.

Figure 11:
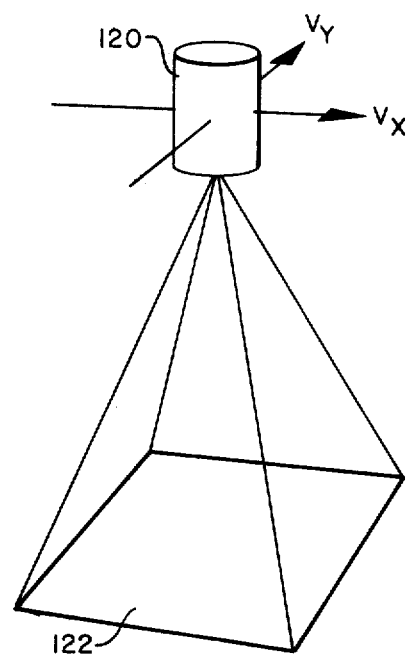
FIG. 11 is a view illustrating relative velocity in two different directions over a target area.

The apparatus thus far described keeps an image of the target area centered on an electron tube target element as the apparatus proceeds over target area in a predetermined direction at a certain velocity. The motion compensation can be effectively applied to any imaging system to correct for high V/H ratios in any axis. By way of example, FIG. 11 shows a TV sensor system 120 viewing a target area 122 and proceeding over it in the X direction at a velocity designated V$_X$. Movement of the apparatus may also result in a lateral component of velocity designated V$_Y$. In such situation, an additional sensor system for determining the lateral velocity component V$_Y$ is provided and utilized such as illustrated in FIG. 12.

Figure 12:
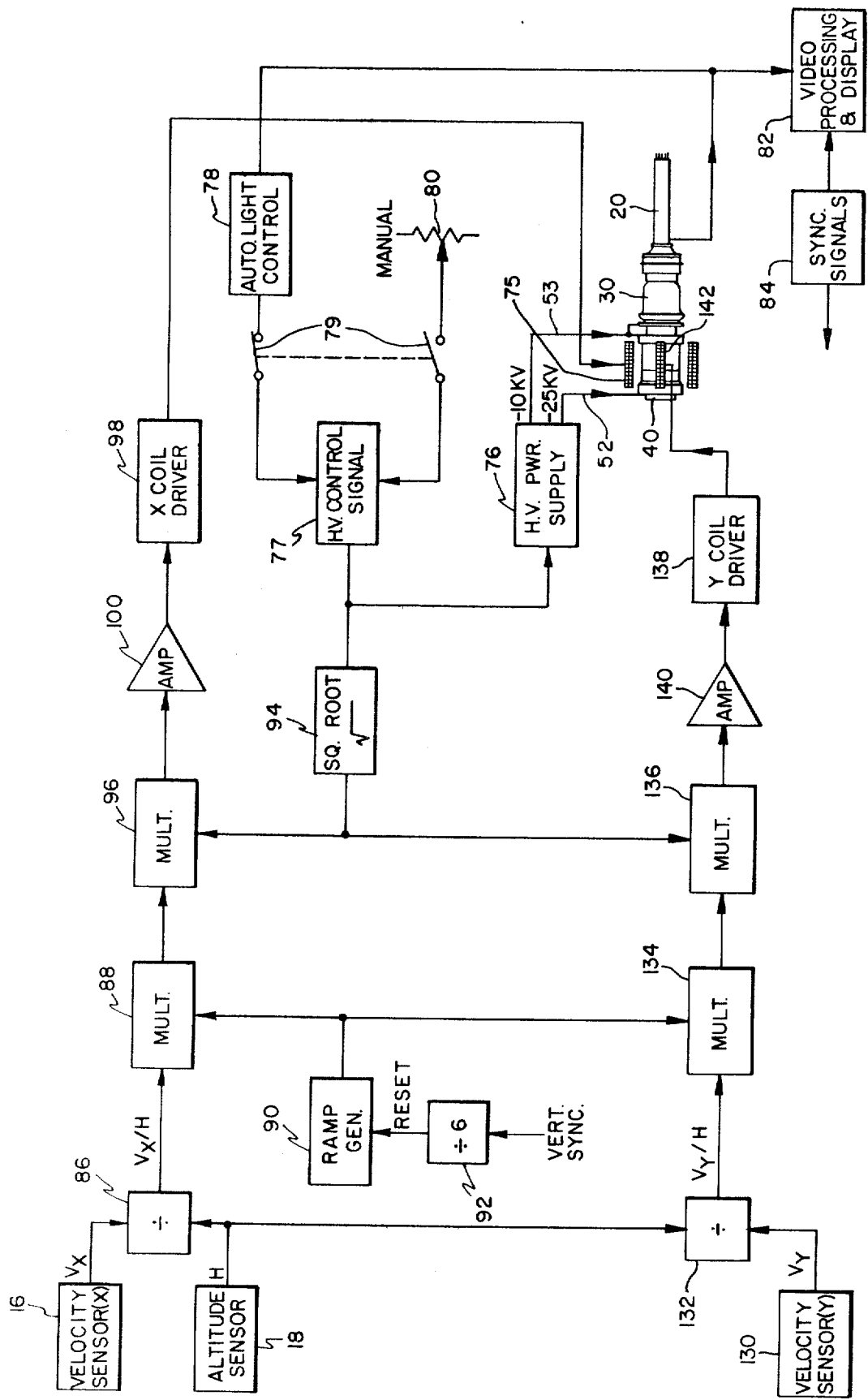
FIG. 12 is a block diagram of another embodiment of the present invention for displaying the output of the TV sensor apparatus utilized in FIG. 11.

FIG. 12 is similar to FIG. 4 and like components have been given the same reference numerals. FIG. 12, however, includes an additional velocity sensor 130 for sensing the Y component of velocity, and this signal V$_Y$ is combined in divider circuit 132 with the altitude signal H from altitude sensor 18 resulting in a V$_Y$/H ratio signal which modifies, in multiplier circuit 134, the output of ramp generator 90. The waveform is further modified, in multiplier 136, by the output of square root circuit 94 and is provided to coil driver 138 after amplification in amplifier 140.

Whereas coil 75 deflected the electron image in image intensifier section 40 to correct for movement in the X direction, coil 142 deflects the electron image to correct for movement in the Y direction, with the result being to center the image on the camera tube's target element for the prescribed number of TV frames.

We claim:

1. Motion compensation apparatus for a TV sensor system adapted for movement relative to a target area to be viewed, comprising:
A. a TV sensor system including
   (i) an imaging device section and
   (ii) an image intensifier section coupled thereto;
B. said imaging device section being operable to receive an energy image of a scene being viewed to provide a video signal indicative thereof;
C. said image intensifier section including a photocathode which transforms an incident photon image of the viewed scene into an electron image;
D. first and second image intensifier high voltage electrodes;
E. a high voltage power supply connected to said electrodes for accelerating said electron image;
F. means for coupling said image to said imaging device section;
G. means for deriving a first signal indicative of the relative velocity, in a first predetermined direction, between said TV sensor system and said area to be viewed;
H. means for deriving a second signal indicative of the distance from said TV sensor system to said area to be viewed;
I. ramp generator means for providing a third signal whose amplitude periodically varies with time;
J. deflection coil means positioned relative to said image intensifier section to deflect said electron image in a first direction;
K. a control circuit operable to provide an output control signal to control the voltage of said power supply;
L. means for deriving a fourth signal proportional to the square root of said control signal, said fourth signal being indicative of the velocity of said accelerated electron image; and
M. means for combining said first, second, third and fourth signals for deriving a coil drive signal and applying said coil drive signal to said deflection coil means.

2. Motion compensation apparatus for a TV sensor system adapted for movement relative to a target area to be viewed, comprising:
A. a TV sensor system including
   (i) a TV camera pick-up tube of the type wherein an electron beam scans a target member which receives an energy image of a scene being viewed to derive a video signal indicative thereof, and which tube exhibits a certain tube lag characteristic and
   (ii) an image intensifier section coupled thereto;
B. said image intensifier section including a photocathode which transforms an incident photo image of the viewed scene into an electron image;
C. first and second image intensifier high voltage electrodes;
D. a high voltage power supply connected to said electrodes for accelerating said electron image;
E. means for coupling said image to said imaging device section;
F. means for deriving a first signal indicative of the relative velocity, in a first predetermined direction, between said TV sensor system and said area to be viewed;
G. means for deriving a second signal indicative of the distance from said TV sensor system to said area to be viewed;
H. ramp generator means for providing a third signal whose amplitude periodically varies with time and whose period is a multiple of the TV frame time;
I. deflection coil means positioned relative to said image intensifier section to deflect said electron image in a first direction;
J. means for combining said first, second and third signals for deriving a coil drive signal and applying said coil drive signal to said deflection coil means;
K. said video output signal being comprised of a series of TV frames; and
L. means for displaying only every n$^{th}$ frame, where n>1.

3. Motion compensation apparatus for a TV sensor system adapted for movement relative to a target area to be viewed, comprising:
A. a TV sensor system including
   (i) an imaging device section and
   (ii) an image intensifier section coupled thereto;
B. said imaging device section being operable to receive an energy image of a scene being viewed to provide a video signal indicative thereof;

C. said image intensifier section including a photocathode which transforms an incident photon image of the viewed scene into an electron image;

D. first and second image intensifier high voltage electrodes;

E. a high voltage power supply connected to said electrodes for accelerating said electron image;

F. means for coupling said image to said imaging device section;

G. means for deriving a first signal indicative of the relative velocity, in a first predetermined direction, between said TV sensor system and said area to be viewed;

H. means for deriving a second signal indicative of the distance from said TV sensor system to said area to be viewed;

I. ramp generator means for providing a third signal whose amplitude periodically varies with time;

J. deflection coil means positioned relative to said image intensifier section to deflect said electron image in a first direction;

K. means for deriving a fourth signal indicative of the velocity of said accelerated electron image;

L. means for dividing said first signal by said second signal and multiplying the result of said division by said third signal; and M. means for multiplying the result of said multiplication by said fourth signal for deriving a coil drive signal; and N. means for applying said coil drive signal to said deflection coil means.

* * * * *